United States Patent
Hofmann (10) Patent No.: US 12,179,529 B2
(45) Date of Patent: Dec. 31, 2024

(54) TWO WAY OFFSET IMPLEMENT HITCH

(71) Applicant: Schulte Industries Ltd., Englefeld (CA)

(72) Inventor: Todd Hofmann, Saskatoon (CA)

(73) Assignee: Schulte Industries Ltd., Englefeld (CA)

( * ) Notice: Subject to any disclaimer, the term of this patent is extended or adjusted under 35 U.S.C. 154(b) by 529 days.

(21) Appl. No.: 17/588,804

(22) Filed: Jan. 31, 2022

(65) Prior Publication Data
US 2022/0242179 A1   Aug. 4, 2022

(30) Foreign Application Priority Data

Feb. 2, 2021   (CA) ..................................... 3107840

(51) Int. Cl.
*B60D 1/44*   (2006.01)
*B60D 1/00*   (2006.01)
*B60D 1/155*  (2006.01)

(52) U.S. Cl.
CPC ............... *B60D 1/44* (2013.01); *B60D 1/155* (2013.01); *B60D 2001/008* (2013.01)

(58) Field of Classification Search
CPC .... B60D 1/44; B60D 1/155; B60D 2001/008; B60D 1/00
See application file for complete search history.

(56) References Cited

U.S. PATENT DOCUMENTS

| | | | | |
|---|---|---|---|---|
| 4,899,523 A * | 2/1990 | Frumholtz | ........... | A01D 34/661 56/192 |
| 5,060,462 A * | 10/1991 | Helfer | .................... | A01D 67/00 56/15.8 |
| 5,201,167 A * | 4/1993 | Rowse | ................... | A01D 75/30 280/412 |
| 5,957,475 A | 9/1999 | Pearen et al. | | |
| 6,739,612 B2 | 5/2004 | Colistro | | |
| 7,334,645 B2 | 2/2008 | Stevenson et al. | | |
| 7,658,056 B2 * | 2/2010 | Thompson | ........... | A01B 73/065 56/15.8 |
| 8,256,198 B2 * | 9/2012 | Thompson | ........... | A01D 34/661 180/53.3 |
| 11,116,124 B2 * | 9/2021 | Anderson | ............ | A01B 69/003 |

\* cited by examiner

*Primary Examiner* — Kevin Hurley
*Assistant Examiner* — Michael R Stabley
(74) *Attorney, Agent, or Firm* — Dickinson Wright PLLC; Andrew D. Dorisio (57) ABSTRACT

An offset towing apparatus for an implement supported by rear wheels rotating about an axis perpendicular to the operating travel direction. A tow arm connects between a vertical towing pivot axis at the towing vehicle and a vertical implement pivot axis at the implement hitch. A middle portion of the tow arm is pivotally attached about a vertical beam pivot to a beam on castor wheels. A strut attached to the implement pivot axis extends laterally and a bar is attached to the strut about a strut pivot axis and extends forward parallel to the tow arm to a front end attached to the beam about a bar pivot axis. The tow arm, the beam, the strut, and the bar form a parallel linkage between the beam pivot axis, the implement pivot axis, the strut pivot axis and the bar pivot axis allowing the implement to pivot to either side.

9 Claims, 6 Drawing Sheets

TWO WAY OFFSET IMPLEMENT HITCH

This disclosure relates to the field towed implements and in particular provides a hitch assembly that allows offset towing to either side of the towing vehicle.

BACKGROUND

It is sometimes desirable to tow an implement along a path that is offset from the path of the tractor. An example is where a rotary mower is used to cut a roadside ditch area that slopes downward from the edge of the road. Conventionally the mower follows substantially behind the tractor, requiring the tractor to travel on the slope of the ditch. This travel path can be hazardous where the ditch slope is steep.

U.S. Pat. No. 5,957,475 to Pearen et al. discloses an offset hitch for towing an implement, such as a rotary mower. The apparatus comprises a frame with a hitch coupling attached on an arm at the front of one end for attachment to the tractor draw bar hitch, and a draw bar hitch at the rear of the opposite end of the frame for attachment to a mower. The mower is conventional and attached to the draw bar hitch of the apparatus such that the mower moves along a path that is offset in a range from generally behind the tractor to a path offset to the right of tractor U.S. Pat. No. 6,739,612 to Colistro discloses an offset hitch for towing an implement, such as a rotary mower. The apparatus comprises a frame with a hitch coupling attached on an arm at the front of one end for attachment to the tractor draw bar hitch, and a draw bar hitch at the rear of the opposite end of the frame for attachment to a mower. The mower is conventional and attached to the draw bar hitch of the apparatus and a brace is attached to the offset hitch frame as well so the mower is held rigid with the frame. The direction of travel is defined by the fixed rear wheels rotating about a rotational axis perpendicular to the operating travel direction of the mower and the wheels on the offset hitch frame are caster wheels which swivel about a vertical axis. The arm swivels so the mower can be towed along a path that is in a range from generally behind to the tractor to a path offset to the right of tractor.

U.S. Pat. No. 7,334,645 to Stevenson et al. discloses an offset hitch for towing an implement, such as a rotary mower, that can tow the implement offset to either the right or left of the tractor. An axle with fixed wheels is attached to the end of a swiveling arm with a front end of the arm pivotally connected to the tractor about a vertical axis. The implement is connected to the axle again about a vertical axis and an actuator pivots the axle with respect to the arm to move the implement to varying offset positions to either side of the tractor.

SUMMARY OF THE INVENTION

The present disclosure provides an offset hitch apparatus that overcomes problems in the prior art.

In a first embodiment the present disclosure provides an offset towing apparatus comprising an implement supported by a rear wheel having a wheel rotational axis substantially perpendicular to an operating travel direction, and an implement hitch extending forward from the implement. A tow arm is adapted at a front end of the tow arm for pivotal attachment to a towing vehicle about a substantially vertical towing pivot axis, and pivotally attached at a rear end of the tow arm to a front end of the implement hitch about a substantially vertical implement pivot axis. A beam is supported by castor wheels pivotally attached to the beam about substantially vertical castor axes to support the beam for movement along the ground in any direction, and the tow arm is supported on the beam and is pivotally attached to a middle portion of the beam about a substantially vertical beam pivot axis at a location forward of the implement pivot axis, A strut is pivotally attached at an inner end of the strut to the implement pivot axis and extends laterally substantially parallel to the beam, the strut defining a substantially vertical strut pivot axis at an outer end of the strut. A bar is pivotally attached at a rear end of the bar to the strut pivot axis and extends forward substantially parallel to the tow arm to a front end of the bar pivotally attached to the beam about a substantially vertical bar pivot axis. A horizontal distance between the beam pivot axis and the implement pivot axis is substantially the same as a horizontal distance between the strut pivot axis and the bar pivot axis, and a horizontal distance between the implement pivot axis and the strut pivot axis is substantially the same as a horizontal distance between the beam pivot axis and the bar pivot axis. An implement brace is attached at a rear end of the implement brace to a portion of the implement that is offset from the implement hitch and extends forward to a forward end of the implement brace attached to the strut. An actuator is operative to selectively pivot the tow arm with respect to the beam about the beam pivot axis.

In a second embodiment the present disclosure provides a method of towing an implement offset to either side of a towing vehicle path, wherein the implement is supported by a rear wheel having a wheel rotational axis substantially perpendicular to an operating travel direction. The method comprises providing an implement hitch extending forward from the implement; providing a tow arm adapted at a front end of the tow arm for pivotal attachment to the towing vehicle about a substantially vertical towing pivot axis, and pivotally attached at a rear end of the tow arm to a front end of the implement hitch about a substantially vertical implement pivot axis; supporting a beam on castor wheels pivotally attached to the beam about substantially vertical castor axes for movement of the beam along the ground in any direction; supporting the tow arm on the beam and pivotally attaching the tow arm to a middle portion of the beam about a substantially vertical beam pivot axis at a location forward of the implement pivot axis; pivotally attaching a strut at an inner end of the strut to the implement pivot axis, the strut extending laterally substantially parallel to the beam, and the strut defining a substantially vertical strut pivot axis at an outer end of the strut; pivotally attaching a bar at a rear end of the bar to the strut pivot axis, the bar extending forward substantially parallel to the tow arm to a front end of the bar; pivotally attaching the front end of the bar to the beam about a substantially vertical bar pivot axis; wherein a horizontal distance between the beam pivot axis and the implement pivot axis is substantially the same as a horizontal distance between the strut pivot axis and the bar pivot axis; wherein a horizontal distance between the implement pivot axis and the strut pivot axis is substantially the same as a horizontal distance between the beam pivot axis and the bar pivot axis; attaching a rear end of an implement brace to a portion of the implement that is offset from the implement hitch, and wherein the implement brace extend forward to a forward end of the implement brace attached to the strut; and providing an actuator operative to selectively pivot the tow arm with respect to the beam about the beam pivot axis The present disclosure provides an offset towing apparatus for an implement that allows the implement to be towed offset to either side of the towing vehicle simply by extending or retracting the actuator. During operation the actuator is fixed in a desired position and the apparatus provides a rigid connection between the pivotal connection of the implement to the towing vehicle and the rear wheels of the implement which are fixed and rotate about a rear wheel axis RWA oriented perpendicular to the operating travel direction improving maneuverability of the apparatus.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-6 illustrate an embodiment of an offset towing apparatus 1 of the present disclosure comprising an implement 3, illustrated as a mower, supported by rear wheels 5 each having a wheel rotational axis WRA oriented perpendicular to an operating travel direction T. An implement hitch 7 extends forward from the implement 3.

A tow arm 9 is adapted at a front end 7A of the tow arm for pivotal attachment to a towing vehicle about a vertical towing pivot axis TPA, and is pivotally attached at a rear end 7B of the tow arm to a front end of the implement hitch 7 about a vertical implement pivot axis IPA.

A beam 11 is supported by castor wheels 13 pivotally attached to the beam 11 about vertical castor axes CA to support the beam for movement along the ground in any direction. The tow arm 9 is supported on the beam 11 and is pivotally attached to a middle portion of the beam 11 about a vertical beam pivot axis BPA at a location forward of the implement pivot axis IPA.

A strut 15 is pivotally attached at an inner end 15A of the strut to the implement pivot axis IPA and extends laterally parallel to the beam 11 and defines a vertical strut pivot axis SPA at an outer end 15B of the strut.

A bar 17 is pivotally attached at a rear end 17B of the bar to the strut pivot axis SPA and extends forward parallel to the tow arm 9 to a front end 17A of the bar that is pivotally attached to the beam about a substantially vertical bar pivot axis BAPA.

Figure 1:
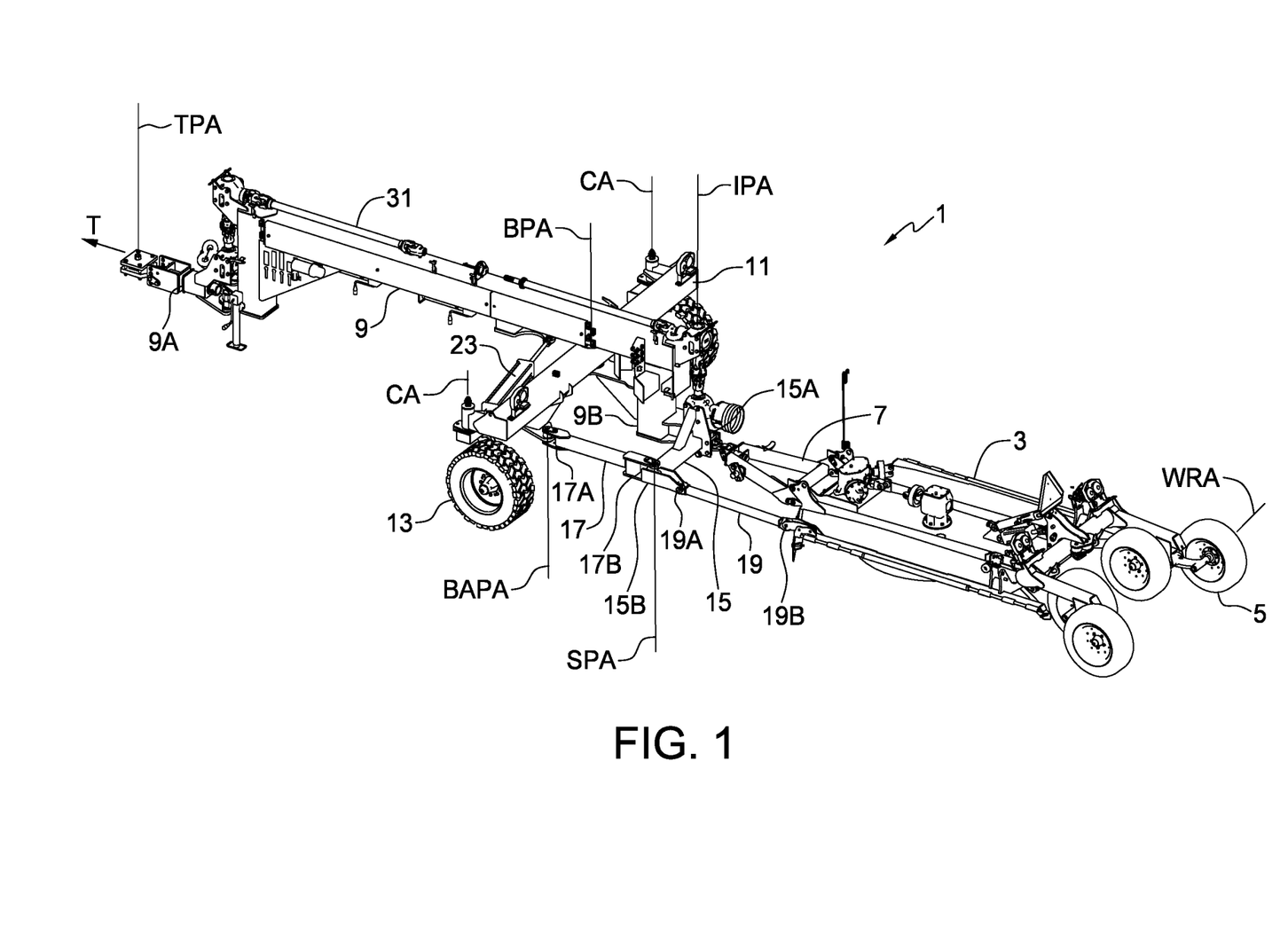
FIG. 1 is a perspective view of an embodiment of the apparatus of the present disclosure where the implement is configured to be towed directly behind the towing vehicle.
Figure 2:
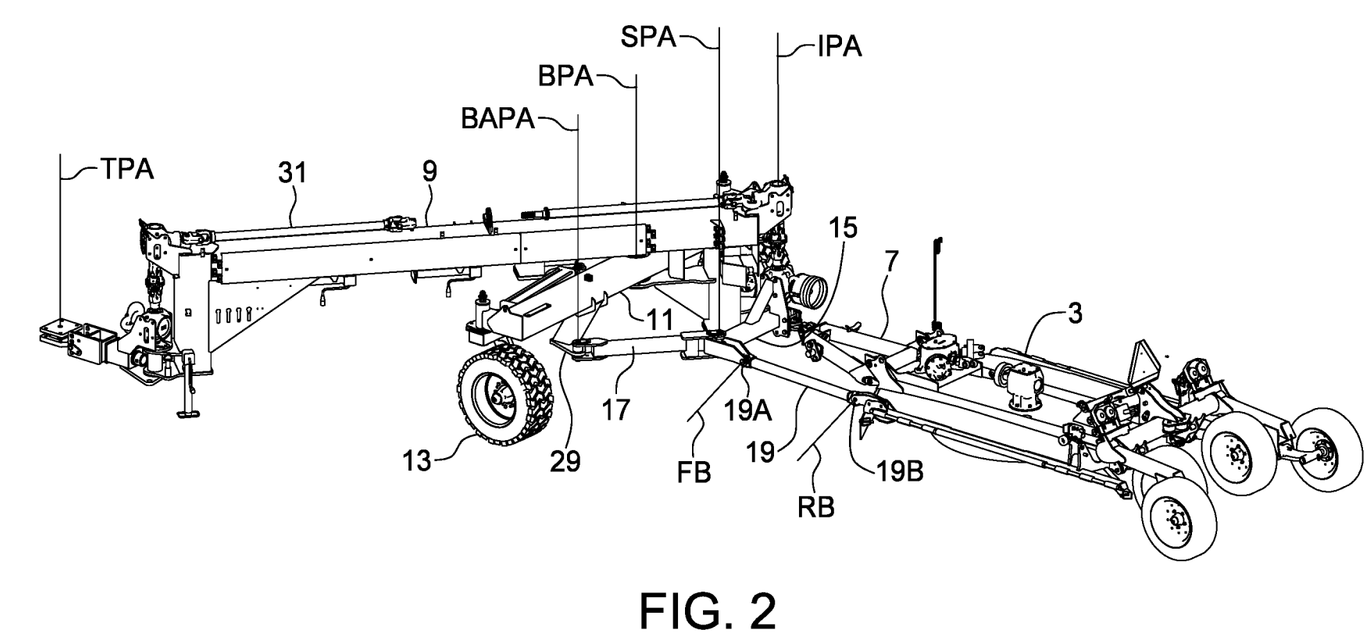
FIG. 2 is a perspective view of the embodiment of FIG. 1 where the implement is configured to be towed along a path to the right of the towing vehicle.
Figure 3:
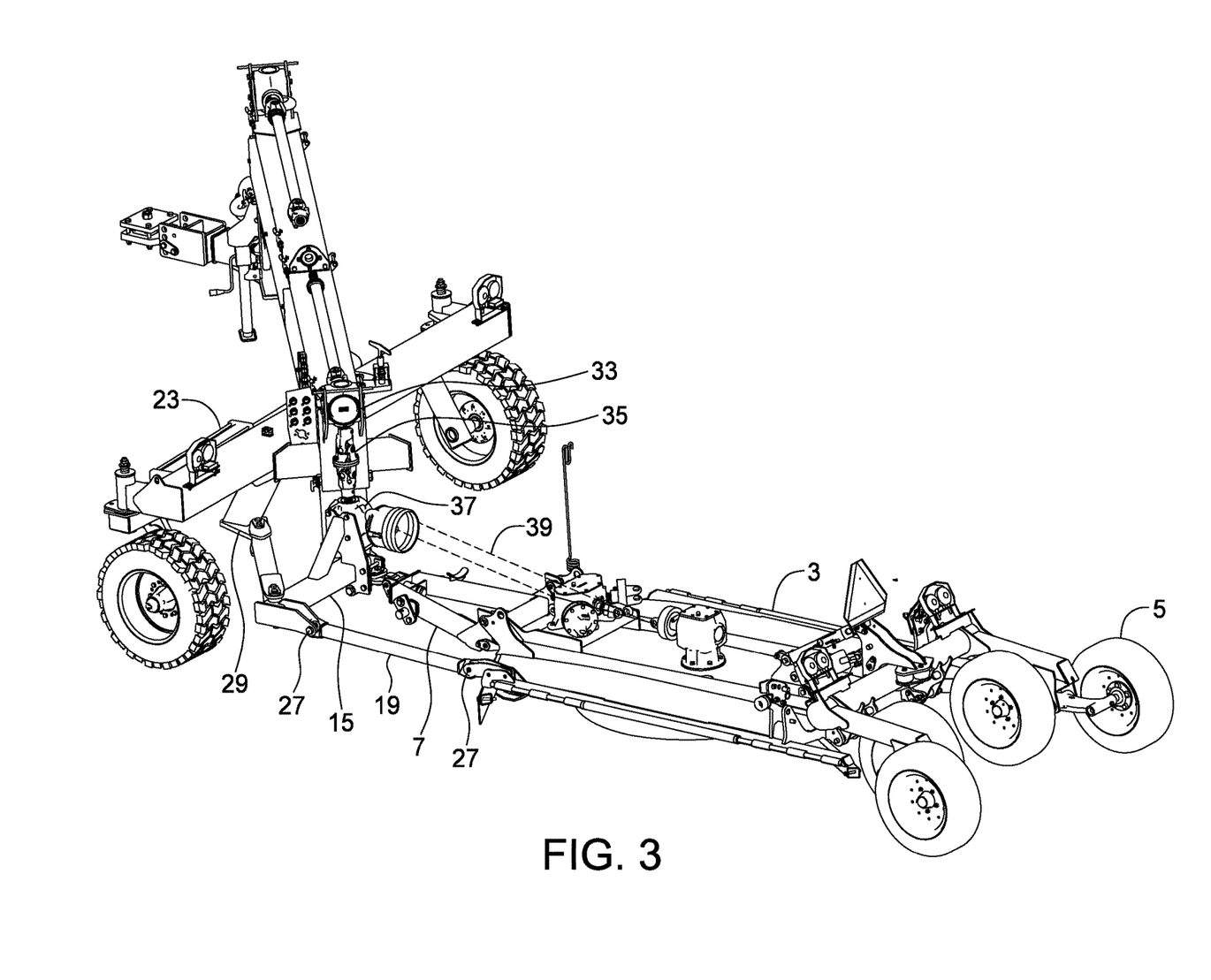
FIG. 3 is a perspective view of the embodiment of FIG. 1 where the implement is configured to be towed along a path to the left of the towing vehicle.
Figure 4:
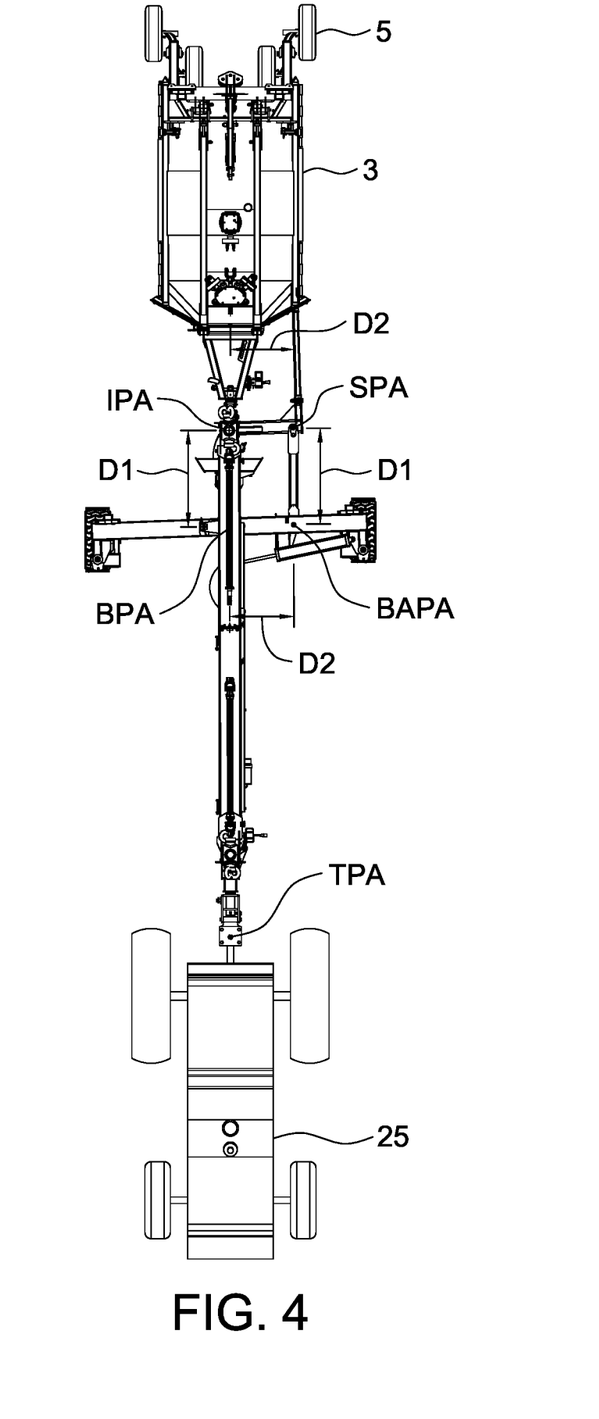
FIG. 4 is a top view of the embodiment of FIG. 1 where the implement is configured to be towed directly behind the towing vehicle.

As seen in FIG. 4, the horizontal distance D1 between the beam pivot axis BPA and the implement pivot axis IPA is substantially the same as the horizontal distance D1 between the strut pivot axis SPA and the bar pivot axis BAPA, and at the same time the horizontal distance D2 between the implement pivot axis IPA and the strut pivot axis SPA is substantially the same as the horizontal distance D2 between the beam pivot axis BPA and the bar pivot axis BAPA. Thus the tow arm 9, beam 11, strut 15, and bar 17 form a parallel linkage 21.

An implement brace 19 is attached at a rear end 19B of the implement brace to a portion of the implement 3 that is offset from the implement hitch 7 and extends forward to a forward end 19A of the implement brace that is attached to the strut 15 such that the implement 3 is attached to the strut 15 at two locations and thus rolls along the ground in an orientation dictated by the strut 15. In the illustrated apparatus 1 the implement brace 19 is configured to maintain the strut 15 substantially perpendicular to the wheel rotational axis WRA. A beam bracket 29 is fixed to the beam 11 and extends downward from the beam 11 and the bar pivot axis BAPA extends through the beam bracket 27 and the front end 17A of the bar 17 is pivotally attached to the beam bracket 29.

Figure 5:
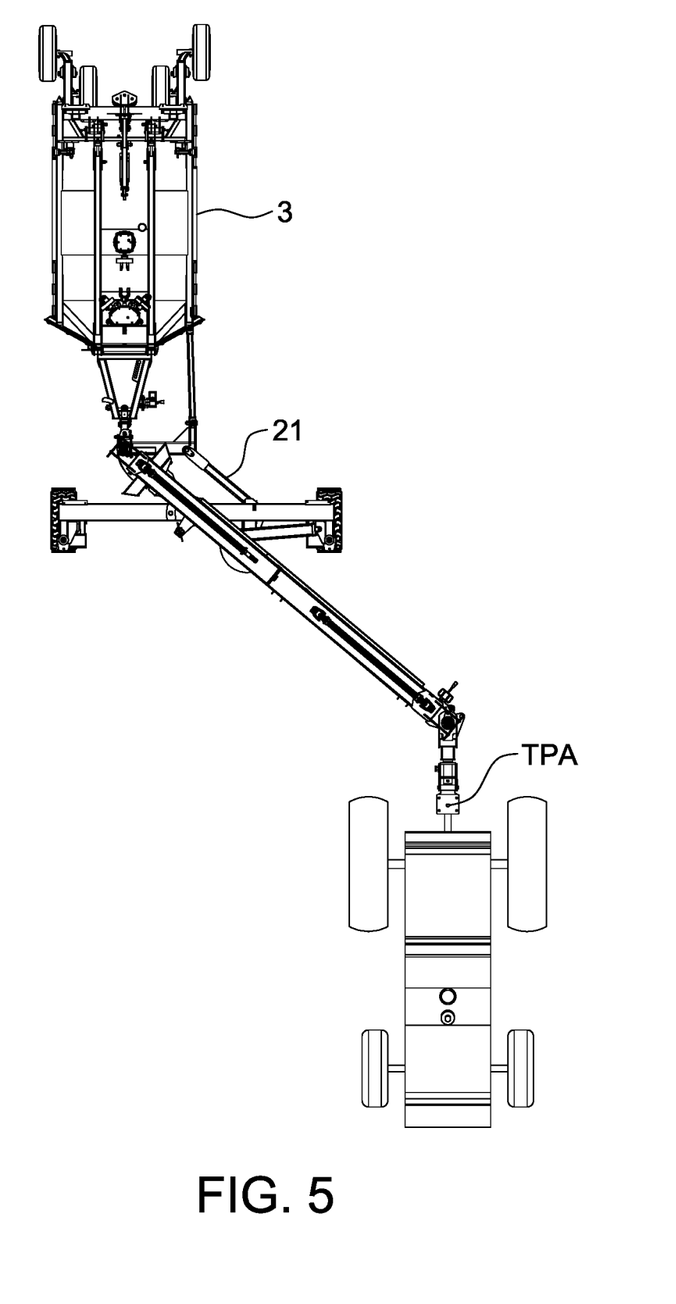
FIG. 5 is a perspective view of the embodiment of FIG. 1 where the implement is configured to be towed along a path to the right of the towing vehicle.
Figures 6, 7:
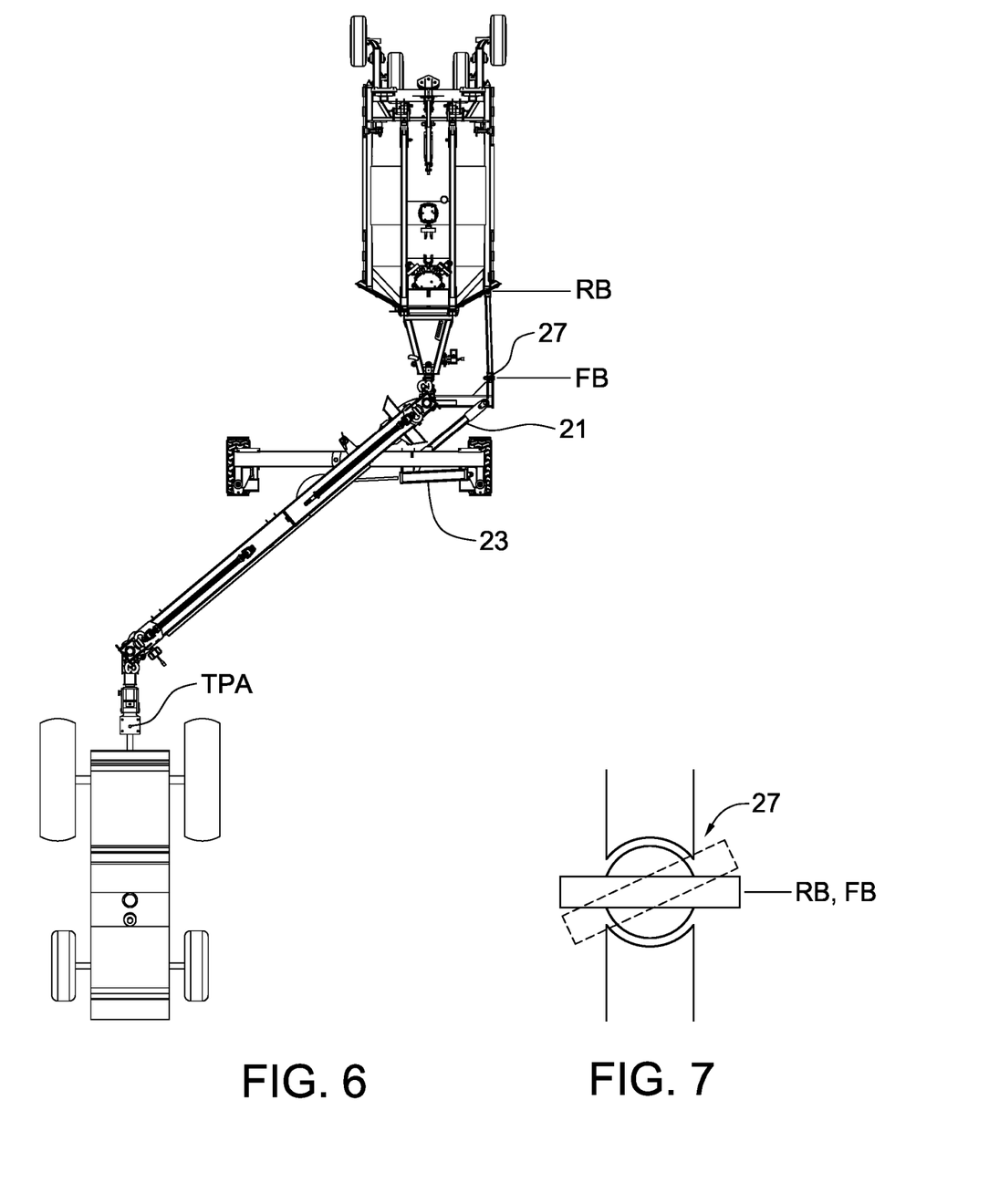
FIG. 6 is a perspective view of the embodiment of FIG. 1 where the implement is configured to be towed along a path to the left of the towing vehicle.
FIG. 7 is a schematic illustration of a swivel joint connecting the implement brace to the implement and to the strut.

An actuator 23 is operative to selectively pivot the tow arm 9 with respect to the beam 11 about the beam pivot axis BPA. With this configuration, when the actuator 23 is extended or retracted as is shown in FIGS. 5 and 6, the implement 3 moves from a path to the right of the tractor 25 towing the implement 3 as shown in FIG. 5 to a path to the left of the tractor 25 as shown in FIG. 6.

Since the wheels 13 supporting the beam 11 and thus the tow arm 9 are caster wheels able to rotate about their caster axes CA in any direction, the direction of the implement 3 is dictated only by the rear wheels 5 and the tractor 25. The only pivot axis that is operational during operation, when the actuator 23 is idle, is the towing pivot axis TPA where the apparatus 1 is connected to the tractor 25. The apparatus 1 thus improves maneuverability over those arrangements where the implement also pivots about the implement pivot axis IPA.

To allow the implement 3 to flex somewhat as it moves along the ground the implement brace 19 is pivotally attached at a rear end 19B of the implement brace to the portion of the implement 3 that is offset from the implement hitch 7 about a substantially horizontal rear brace pivot axis RB and the forward end 19A of the implement brace 19 is pivotally attached to the strut 15 about a substantially horizontal front brace pivot axis FB. Further flexing is provided by providing a swivel joint 27 at each end of the implement brace 19 as schematically illustrated in FIG. 7.

Where the implement 3 is a mower or the like which requires rotational power from the tractor 25 an arm driveshaft 31 extends along the tow arm 9 from a front end 9A of the tow arm to a rear end 9B of the tow arm The rear end of the arm driveshaft 31 is coupled to a top gear box 33 and a rear drive shaft 35 extending downward from the top gear box 33 to a bottom gear box 37 rotates about the implement pivot axis IPA. The implement driveshaft 39 is shown in phantom lines in FIG. 3 and is connected to the bottom gear box 37 and the bottom gear box 37 pivots about the implement pivot axis IPA. In the illustrated apparatus 1 the strut 15 is connected to the bottom gear box 37. The implement driveshaft 39 has been removed in the other figures to facilitate illustration of the apparatus 1.

The present disclosure also provides a method of towing an implement 3 offset to either side of a towing vehicle path, wherein the implement 3 is supported by a rear wheel 5 having a wheel rotational axis WRA substantially perpendicular to an operating travel direction T. The method comprises providing an implement hitch 7 extending forward from the implement 3; providing a tow arm 9 adapted at a front end 9A of the tow arm for pivotal attachment to the towing vehicle 25 about a substantially vertical towing pivot axis TPA, and pivotally attached at a rear end 9B of the tow arm to a front end of the implement hitch 7 about a substantially vertical implement pivot axis IPA; supporting a beam 11 on castor wheels 13 pivotally attached to the beam about substantially vertical castor axes CA for movement of the beam 11 along the ground in any direction; supporting the tow arm 9 on the beam 11 and pivotally attaching the tow arm to a middle portion of the beam 11 about a substantially vertical beam pivot axis BPA at a location forward of the implement pivot axis IPA; pivotally attaching a strut 15 at an inner end 15A of the strut to the implement pivot axis IPA, the strut 15 extending laterally substantially parallel to the beam 11, and the strut 15 defining a substantially vertical strut pivot axis SBA at an outer end 15B of the strut; pivotally attaching a bar 17 at a rear end 17B of the bar to the strut pivot axis SBA, the bar 17 extending forward substantially parallel to the tow arm 9 to a front end 17A of the bar; pivotally attaching the front end 17A of the bar to the beam 11 about a substantially vertical bar pivot axis BAPA; wherein a horizontal distance D1 between the beam pivot axis BPA and the implement pivot axis IPA is substantially the same as a horizontal distance D1 between the strut pivot axis SPA and the bar pivot axis BAPA; wherein a horizontal distance D2 between the implement pivot axis IPA and the strut pivot axis SPA is substantially the same as a horizontal distance D2 between the beam pivot axis BPA and the bar pivot axis BAPA; attaching a rear end 19B of an implement brace 19 to a portion of the implement 3 that is offset from the implement hitch 7, and wherein the implement brace 19 extends forward to a forward end 19A of the implement brace attached to the strut 15; and providing an actuator 23 operative to selectively pivot the tow arm 9 with respect to the beam 11 about the beam pivot axis BPA.

The present disclosure provides an offset towing apparatus 1 for an implement 3 that allows the implement to be towed offset to either side of the towing vehicle 25 simply by extending or retracting the actuator 23. During operation the actuator 23 is fixed in a desired position and the apparatus 1 provides a rigid connection between the pivotal connection of the implement 3 to the towing vehicle 25 and the rear wheels 5 of the implement which are fixed and rotate about a rear wheel axis RWA oriented perpendicular to the operating travel direction T improving maneuverability.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An offset towing apparatus comprising:
    an implement supported by a rear wheel having a wheel rotational axis substantially perpendicular to an operating travel direction;
    an implement hitch extending forward from the implement;
    a tow arm adapted at a front end of the tow arm for pivotal attachment to a towing vehicle about a substantially vertical towing pivot axis, and pivotally attached at a rear end of the tow arm to a front end of the implement hitch about a substantially vertical implement pivot axis;
    a beam supported by castor wheels pivotally attached to the beam about substantially vertical castor axes to support the beam for movement along the ground in any direction;
    wherein the tow arm is supported on the beam and is pivotally attached to a middle portion of the beam about a substantially vertical beam pivot axis at a location forward of the implement pivot axis;
    a strut pivotally attached at an inner end of the strut to the implement pivot axis and extending laterally substantially parallel to the beam, the strut defining a substantially vertical strut pivot axis at an outer end of the strut;
    a bar pivotally attached at a rear end of the bar to the strut pivot axis and extending forward substantially parallel to the tow arm to a front end of the bar pivotally attached to the beam about a substantially vertical bar pivot axis;
    wherein a horizontal distance between the beam pivot axis and the implement pivot axis is substantially the same as a horizontal distance between the strut pivot axis and the bar pivot axis;
    wherein a horizontal distance between the implement pivot axis and the strut pivot axis is substantially the same as a horizontal distance between the beam pivot axis and the bar pivot axis;
    an implement brace attached at a rear end of the implement brace to a portion of the implement that is offset from the implement hitch and extending forward to a forward end of the implement brace attached to the strut; and
    an actuator operative to selectively pivot the tow arm with respect to the beam about the beam pivot axis.

2. The apparatus of claim 1 wherein the implement brace is configured to maintain the strut substantially perpendicular to the wheel rotational axis.

3. The apparatus of claim 1 wherein the implement brace is pivotally attached at a rear end of the implement brace to the portion of the implement that is offset from the implement hitch about a substantially horizontal rear brace pivot axis and the forward end of the implement brace is pivotally attached to the strut about a substantially horizontal front brace pivot axis.

4. The apparatus of claim 3 wherein the implement brace is pivotally attached at a rear end of the implement brace to the portion of the implement that is offset from the implement hitch by a rear swivel joint and the forward end of the implement brace is pivotally attached to the strut by a front swivel joint.

5. The apparatus of claim 1 comprising a beam bracket extending downward from the beam and wherein the bar pivot axis extends through the beam bracket and the front end of the bar is pivotally attached to the beam bracket.

6. The apparatus of claim 1 comprising an arm driveshaft extending along the tow arm from the front end of the tow arm to the rear end of the tow arm, and wherein the rear end of the arm driveshaft is coupled to a top gear box and a rear drive shaft extending downward from the top gear box to a bottom gear box rotates about the implement pivot axis.

7. The apparatus of claim 6 wherein an implement driveshaft is connected to the bottom gear box and wherein the bottom gear box pivots about the implement pivot axis.

8. The apparatus of claim 7 wherein the strut is connected to the bottom gear box.

9. A method of towing an implement offset to either side of a towing vehicle path, wherein the implement is supported by a rear wheel having a wheel rotational axis substantially perpendicular to an operating travel direction; the method comprising:
- providing an implement hitch extending forward from the implement;
- providing a tow arm adapted at a front end of the tow arm for pivotal attachment to the towing vehicle about a substantially vertical towing pivot axis, and pivotally attached at a rear end of the tow arm to a front end of the implement hitch about a substantially vertical implement pivot axis;
- supporting a beam on castor wheels pivotally attached to the beam about substantially vertical castor axes for movement of the beam along the ground in any direction;
- supporting the tow arm on the beam and pivotally attaching the tow arm to a middle portion of the beam about a substantially vertical beam pivot axis at a location forward of the implement pivot axis;
- pivotally attaching a strut at an inner end of the strut to the implement pivot axis, the strut extending laterally substantially parallel to the beam, and the strut defining a substantially vertical strut pivot axis at an outer end of the strut;
- pivotally attaching a bar at a rear end of the bar to the strut pivot axis, the bar extending forward substantially parallel to the tow arm to a front end of the bar;
- pivotally attaching the front end of the bar to the beam about a substantially vertical bar pivot axis;
- wherein a horizontal distance between the beam pivot axis and the implement pivot axis is substantially the same as a horizontal distance between the strut pivot axis and the bar pivot axis;
- wherein a horizontal distance between the implement pivot axis and the strut pivot axis is substantially the same as a horizontal distance between the beam pivot axis and the bar pivot axis;
- attaching a rear end of an implement brace to a portion of the implement that is offset from the implement hitch, and wherein the implement brace extend forward to a forward end of the implement brace attached to the strut; and
- providing an actuator operative to selectively pivot the tow arm with respect to the beam about the beam pivot axis.

* * * * *